Figure 1:
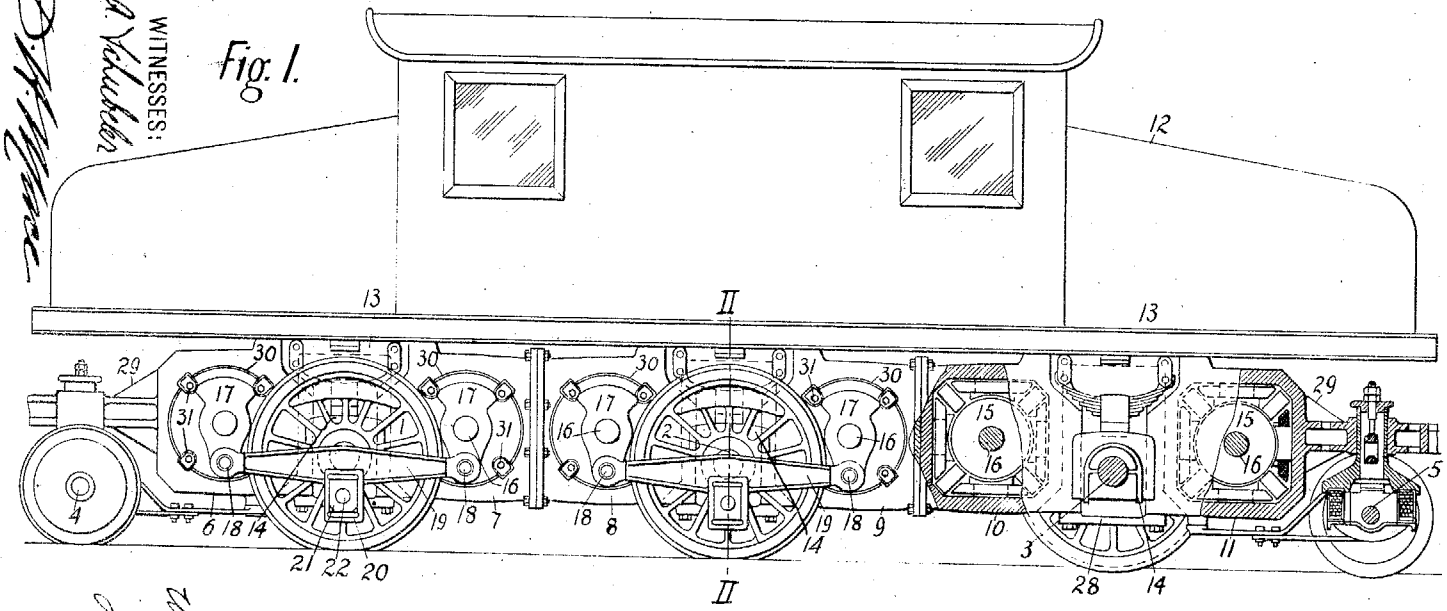

J. LE C. DAVIS, DEC'D.

WESTINGHOUSE ELECTRIC & MFG. CO., ASSIGNEE.

ELECTRIC LOCOMOTIVE.

APPLICATION FILED FEB. 25, 1914.

Reissued July 21, 1914. 13,777.

WITNESSES:

M. A. Schubeler

D. H. Mance

Westinghouse Electric & Manufacturing Co.
assignee of INVENTOR
Joseph Le C. Davis
deceased

BY

Wesley G. Carr

ATTORNEY

UNITED STATES PATENT OFFICE.

JOSEPH LE CONTE DAVIS, DECEASED, LATE OF PITTSBURGH, PENNSYLVANIA, BY WESTINGHOUSE ELECTRIC & MFG. CO., A CORPORATION OF PENNSYLVANIA, ASSIGNEE.

ELECTRIC LOCOMOTIVE.

13,777. Specification of Reissued Letters Patent. Reissued July 21, 1914.

Original No. 1,074,841, dated October 7, 1913, Serial No. 609,945. Application for reissue filed February 25, 1914. Serial No. 821,099.

*To all whom it may concern:*

Be it known that JOSEPH LE C. DAVIS, deceased, late of Pittsburgh, in the county of Allegheny and State of Pennsylvania, during his lifetime invented certain new and useful Improvements in Electric Locomotives, and that WESTINGHOUSE ELECTRIC & MFG. CO., a corporation organized and existing under the laws of Pennsylvania, assignee of JOSEPH LE C. DAVIS, now deceased, hereby declares to the best of its knowledge and belief that the following specification, taken in connection with the drawings furnished and forming a part of the same, is a clear, true, and complete description of said improvement.

The invention relates to electric locomotives and other railway vehicles and particularly to such locomotives as are adapted for hauling very heavy trains at relatively high speeds.

One object of the invention is to provide a railway vehicle of the class above indicated, that shall be simple in construction and involve the use of a minimum number of parts on the running gear.

A second object of the invention is to permit the use of driving motors of relatively large size, and at the same time, to provide a particularly simple and direct operative connection between the motors and the driving axles.

A further object is to uniformly distribute the weight of the motors on the axles and to maintain a symmetrical arrangement between each axle and the motors associated therewith.

A still further object of the invention is to provide a locomotive frame or running gear which embodies several independent magnetizable motor frames or other sectional members which are secured rigidly together in abutting relation and which severally constitute entire and inseparable longitudinal units of the running gear.

Electric locomotives have heretofore been constructed in which the motor armatures were mounted directly upon the axles of the vehicle, but, with this arrangement, the size and capacity of the motors are necessarily limited by the size of the driving wheels and, in order to avoid objectionable wear on the track and roadbed, some relatively expensive yielding connection is provided between the motor armatures and the driving wheels.

According to the present invention, the motor frames are either cast integral or are bolted or otherwise secured together to constitute a single combined locomotive frame structure and motor field frame structure. The motors are arranged in pairs, the upper halves of the motor frames being joined together in the form of a yoke, and the two motors of each pair being symmetrically disposed relative to one of the vehicle axles which is free to adjust itself vertically in the space between the motors. Adjacent groups of motors are either bolted together and form complete inseparable units of the locomotive frame, as above indicated, or may be integral. The locomotive frame, consisting of the group of motors, is yieldingly supported by means of springs which rest on the journal boxes of the driving axles, in the usual manner. The cab of the locomotive is mounted directly on the group of motor frames which constitute the frame of the locomotive.

Figure 3:
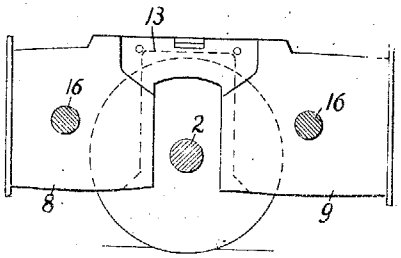
Figure 2:
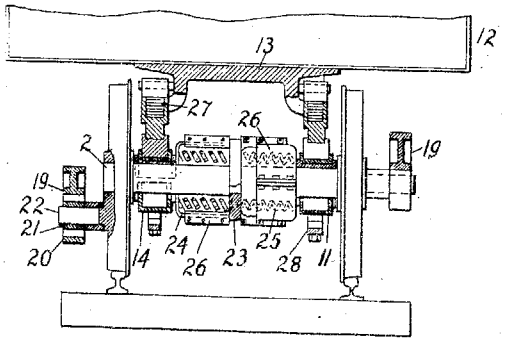

Figure 1 of the accompanying drawings, is a side elevation, with one driving wheel removed, and one pair of motors shown in cross section, of a locomotive constructed in accordance with my invention. Fig. 2 is a transverse sectional elevation on the line II—II of Fig. 1. Fig. 3 is a side elevation of one pair of the motors embodied in the locomotive shown in Fig. 1, the motor shafts and the corresponding axle being shown in section.

Referring to the drawings, the locomotive here shown comprises a plurality of driving wheel axles 1, 2 and 3, guide wheel axles 4 and 5, a plurality of driving motors 6, 7, 8, 9, 10 and 11, the frames of which constitute the locomotive frame, and a cab or body 12.

The driving motors may be divided into three groups of two each, the motors 6 and 7 being associated with, and operatively connected to, the axle 1, and the motors 8 and 9 and 10 and 11 bearing the same relation, respectively, to the axles 2 and 3. The two motors which constitute one group are symmetrical relative to the axle with which they are associated and are joined by means of a yoke 13 which is integral with the motor frames and constitute pedestals to receive the journal boxes 14 with which each axle is provided.

The motor armatures 15 are provided with shafts 16, in the usual manner, to the ends of which, crank heads 17 are secured. The crank heads are each provided with crank pins 18 which are connected to the respective ends of Scotch yokes 19, having the usual offset projections 20, in which the bearing blocks 21 for wheel center pins 22 are adjustably supported. By this arrangement, the two motors are direct-connected to the axle between them by means of a very simple connection while the motors form a part of the body of the locomotive (their frames, in fact, constituting a part of the locomotive frame) and are spring-borne parts of the locomotive. It is therefore evident that the inertia of the wheel axles is relatively small, so that they readily follow the irregularities and curves of the track.

The structure lends itself readily to railway service since it is easy to disconnect one pair of side rods or yokes and to then drop out one of the wheel axles. The motor armatures may then be removed and repaired or replaced by removing the usual end brackets 30 which are held in position by bolts 31.

The axles may be centered by any suitable yielding means, such as that shown in Fig. 2 of the drawings, to which special reference may now be had.

As here shown, the wheel axle is provided with a central collar 23 and two sets of helical springs 24 and 25 which are disposed about the axle, one set on each side of the center between the collar and one of the journal boxes 14. The springs are preferably inclosed in telescoping casings 26, or are covered by some other suitable means in order to exclude the dirt.

Any suitable springs, or combination of springs, and links and levers may be employed for supporting the locomotive frame on the journal boxes.

For convenience of illustration, I have shown semi-elliptic springs 27, the ends of which are secured to the yoke 13, and the middle portions of which are mounted directly on the journal boxes.

Pedestal binders 28 are preferably provided in the usual manner, although the frame structure is sufficiently rigid to permit the entire locomotive to be lifted from the axles by the ends of the frame.

The guide wheel axles 4 and 5 are preferably employed when the driving wheels are relatively large, but they may, otherwise, be omitted. When they are employed, they may be pivotally secured to projections 29 on the locomotive frame, as shown in Fig. 1 of the drawings, so that they constitute swivel pony trucks.

The invention is not restricted to the arrangement illustrated in the drawings, and it is desired that only such limitations shall be imposed as are indicated in the appended claims.

1. A railway vehicle comprising wheel axles, and a plurality of driving motors having frames which together constitute the entire frame of the locomotives.

2. A railway vehicle comprising wheel axles, and a plurality of driving motors arranged in pairs having their armatures operatively connected to the axles and having their field magnet frames joined together to constitute the vehicle frame.

3. A railway vehicle comprising wheel axles, a pair of driving motors, for each axle, Scotch yoke connections between the armatures of each pair of motors and the corresponding axle, and yokes joining the motor frames together over the axles.

4. A railway vehicle comprising a plurality of wheel axles, and electric driving motors having armatures connected to the wheel axles in pairs and having field magnet frames which together constitute a yieldingly supported locomotive frame.

5. A railway vehicle comprising a plurality of wheel axles, a frame yieldingly supported thereon, a body mounted on the frame and a plurality of driving motors arranged in pairs and respectively associated with, and operatively connected to, the wheel axles, the locomotive frame being composed of the joined frames of the driving motors.

6. A locomotive frame comprising a plurality of independent magnetizable frames secured rigidly togteher in abutting relation.

7. A locomotive frame embodying a plurality of magnetizable motor members constituting entire and inseparable longitudinal units of said frame.

8. A railway locomotive embodying driving wheels and a plurality of driving motors having their armatures operatively connected to said wheels and their magnetizable frames rigidly associated to constitute inseparable units of the locomotive frame.

9. A railway locomotive frame embodying driving wheels and a plurality of driving motors having magnetizable frames which are rigidly secured one to the other in end to end relation, each frame constituting an entire and inseparable longitudinal unit of said locomotive frame.

10. A locomotive frame comprising a plurality of independent sections rigidly secured together in abutting relation, one of said sections constituting a magnetizable motor frame.

11. A locomotive frame comprising independent sections rigidly secured together in abutting relation, and the middle section constituting a magnetizable motor frame.

12. A locomotive frame comprising a magnetizable motor frame, end members rigidly secured in abutting relation thereto, and guiding trucks pivotally associated with said end members.

13. A locomotive frame comprising a magnetizable motor frame, end members rigidly secured in abutting relation thereto, and pedestal members, axles, and wheels associated with said end members.

14. A locomotive frame comprising a magnetizable motor frame, end members rigidly secured in abutting relation thereto, guiding trucks pivotally associated with said end members, and pedestal members, axles and wheels associated with said end members.

15. A locomotive running gear comprising a plurality of separate longitudinal sections of substantially the full width thereof secured directly and rigidly together in abutting relation, each of said sections constituting a complete and inseparable part of said running gear.

16. A locomotive frame embodying a magnetizable inclosed motor member which constitutes an entire portion of the frame throughout its length; and driving wheels outside of said motor member.

17. A locomotive frame embodying at least one magnetizable inclosed motor member which constitutes an entire and inseparable longitudinal unit of said frame, and driving wheels outside of said motor member.

18. A locomotive frame embodying a plurality of independent detachable rigidly joined longitudinal sections, one of said sections constituting a stationary frame of a driving unit.

19. A locomotive frame embodying a plurality of independent detachable rigidly joined longitudinal sections, one of said sections constituting a magnetizable stationary member of an electric motor.

20. An electric locomotive frame embodying a twin motor structure constituting an entire longitudinal portion of said frame and a plurality of end frame portions secured thereto.

21. A locomotive frame comprising an integral magnetizable stationary member adapted to receive a pair of rotatable armatures, and longitudinally projecting frame portions coöperating with the ends of said magnetizable member and secured thereto.

22. A locomotive frame embodying a plurality of electric motors having field magnet members and armatures and a common shaft operatively associated with said armatures, the field magnet members of said motors constituting an integral structure and a complete and inseparable unit of said locomotive frame.

23. A locomotive frame embodying a unitary twin motor magnetizable frame having a centrally disposed opening, a pair of armatures associated therewith, and a shaft disposed in said opening and operatively connected to said pair of armatures, said magnetizable frame being a complete and inseparable unit of said locomotive frame.

24. A locomotive frame comprising a magnetizable motor member, projecting end portions secured to said motor member, and driving wheels associated with said end portions.

Signed this 20th day of Feb. 1914.

WESTINGHOUSE ELECTRIC & MFG. CO.,
By H. D. SHUTE,
*Acting Vice-President.*

Witnesses:
B. B. HINES,
M. C. MERZ.